United States Patent [19]

Takanashi et al.

[11] 4,227,208

[45] Oct. 7, 1980

[54] OPTICAL COMB FILTER

[75] Inventors: Itsuo Takanashi, Yokohama; Koichiro Motoyama, Ninomiya; Tadayoshi Miyoshi, Yokohama; Shintaro Nakagaki, Yokohama; Sumio Yokokawa, Yokohama; Kenichi Miyazaki, Sagamihara, all of Japan

[73] Assignee: Victor Company of Japan, Ltd., Yokohama, Japan

[21] Appl. No.: 942,283

[22] Filed: Sep. 14, 1978

[30] Foreign Application Priority Data

Sep. 17, 1977 [JP] Japan .................. 52-111841

[51] Int. Cl.$^2$ .............................. H04N 9/04
[52] U.S. Cl. .............................. 358/55
[58] Field of Search .......................... 358/43, 44, 55; 350/162 S, 162 F, 162 R, 157, 158

[56] References Cited

U.S. PATENT DOCUMENTS

| 3,784,734 | 1/1974 | Watanabe et al. | 358/55 |
| 3,940,788 | 2/1976 | Abe et al. | 358/55 |
| 4,100,570 | 7/1978 | Nobutoki et al. | 358/55 |

*Primary Examiner*—Richard Murray

[57] ABSTRACT

An optical comb filter has a plurality of optical comb filter elements disposed successively in the advancing direction of light. The optical comb filter characteristics attenuate and remove specific space frequencies which do not have mutual relationships of odd-number multiples and frequencies of the specific space frequencies. At least one phase plate is interposed between neighboring optical comb filter elements in front and rear positions with respect to the light advancing direction. The phase plate converts a light exiting from the front filter element into a light which is divided in the rear filter element into normal light and abnormal light, exiting with mutually equal light quantity. The normal and abnormal light enters, as incident light, the rear filter element.

5 Claims, 8 Drawing Figures

OPTICAL COMB FILTER

BACKGROUND OF THE INVENTION

The present invention relates to optical comb filters, and more particularly to an optical comb filter having a comb filter characteristic with attenuation points at a plurality of specific space frequencies and at frequencies which are odd-number multiples of the specific space frequencies.

In a color television camera employing a color resolution stripped filter of a known type, an output signal results from a chrominance signal modulating a signal having a space frequency value corresponding to a constantly repeated arrangement of fine color stripes of the color resolution filter positioned in the light path between the object being picked up and the photoelectric surface or photoconductive layer of the camera tube. Accordingly, interference occurs between the signal of the specific space frequency, determined by the color resolution striped filter, and the signal obtained from the object as a result, a beat disturbance appears in the reproduced picture.

Accordingly, with the aim of solving this problem, a known method uses an optical low-pass filter which depends on a device such as a lenticular lens or a phase grid plate. The light image of the color resolution striped filter is applied in a defocused state, in only the horizontal scanning line direction, to the photoconductive layer of the camera tube.

This previously known method encountered problems owing to such causes as variation in optical characteristics, variation in light due to adjustment of the camera lens aperture, the installation position, and a nonuniformity of the refractive index and transmission index. The striped pattern of the lenticular lens of the phase grid plate is projected onto the photoconductive layer in some instances. In such a case, an additional interference occurs between the striped pattern of the lenticular lens or the phase grid plate and the striped pattern of the color resolution striped filter. Beats are disadvantageously produced in the reproduced picture.

Another known method is intended to solve the above described problem and to overcome the difficulty of the above described method. A flat plate of a transparent anisotropic substance having a double refraction characteristic is used as an optical comb filter. This optical comb filter has a characteristic with attenuation points at the specific space frequency, according to an arrangement of a constant repetition of the fine color stripes of the color resolution striped filter. Attenuation also occurs at frequencies which are odd-number multiples of the space frequency. There are pass bands for DC component at frequencies which are even-number multiples of the space frequency. In this optical comb filter, there is an offset distance $\Delta l$ between a normal light (normal light ray) and an abnormal light (abnormal light ray) appearing on the light exiting surface side of the filter as a result of light entering the incident surface side and undergoing double refraction. If the offset distance $\Delta l$ becomes one half of the repetition period of the space frequency of the object, the signal component of this space frequency of the object is removed.

However, there is a difficulty accompanying this optical comb filter. If the incident light entering this filter has a specific polarization, a difference arises in the light quantities of the normal light and the abnormal light appearing on the light-exiting surface side of this filter. Then, satisfactory comb characteristics can no longer be exhibited. Furthermore, in the extreme case, only either the normal light or the abnormal light appears on the light-exiting surface of the optical comb filter. Then, the comb filter characteristics become completely lost. Furthermore, if a semitransparent mirror is provided on the front surface of an optical comb filter, or if the object has a uniform reflection surface, an incident light projected into the incidence surface of the filter becomes polarized light. Consequently, the normal light and the abnormal light exit, with a great difference in light quantity, from the light-exiting surface of the comb filter. In this case, the optical comb filter cannot function as one having desirable comb filter characteristics.

If a plurality of signals of a specific space frequency are generated by the color resolution striped filter, it is necessary to remove the components of the specific space frequency by means of an optical comb filter. However, an optical comb filter employing a flat plate of a transparent anisotropic substance has the above mentioned double refraction characteristic, with attenuation points at a specific space frequency and at odd-number multiples thereof. Accordingly, a plurality of signals having different space frequencies, without mutual relationship of odd-number multiples, cannot be removed.

Accordingly, for removing these space frequencies, the combination of a plurality of optical comb filter elements capable of separately removing respective space frequencies would appear to be feasible.

However, as described hereinafter in conjunction with the drawing, an optical comb filter having attenuation points in a plurality of space frequencies cannot be obtained by merely combining a plurality of optical comb filters. The only result of such a combination will be the production of an optical comb filter of a characteristic in which there are attenuation points at one frequency which is different from any of the removal frequencies and at frequencies which are odd-number multiples of that one frequency.

SUMMARY OF THE INVENTION

Accordingly, it is a general object of the present invention to provide a novel and useful optical comb filter in which the above described difficulties have been overcome.

Another and specific object of the invention is to provide an optical comb filter having attenuation points at a plurality of specific space frequencies which are not in an odd-number multiple relationship with each other and at frequencies which are odd-number multiples of the above specific space frequencies.

Still another object of the present invention is to provide an optical comb filter in which a phase plate for converting linearly polarized light into circularly polarized light is interposed between adjacent optical comb filter elements.

Other objects and further features of the present invention will be apparent from the following detailed description with respect to preferred embodiments of the invention when read in conjunction with the accompanying drawings.

DETAILED DESCRIPTION

Figure 1:
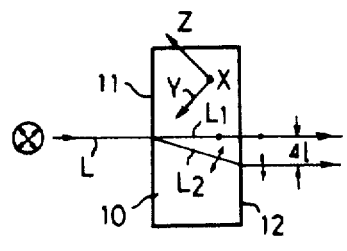
FIG. 1 is a diagrammatic plan view of an optical comb filter element for describing the functional principles thereof.

The general function of one optical comb filter element will first be described with reference to FIG. 1. The optical comb filter element 10 comprises a flat plate of a transparent anisotropic substance (for example, rock crystal or crystallized quartz) having double refractivity. The light axis Z and axes X, Y are orthogonal coordinate axes. The axis X is perpendicular to the plane of the drawing and is represented in the drawing by a small black round dot. The axes Y and Z lie in the plane of the drawing they perpendicularly intersect each other. The incidence plane 11 and the light-exiting plane 12 of the filter element 10 are both parallel to the axis X.

A natural light ray L entering the filter element 10, through its incidence surface 11, advances through the anisotropic medium along divided paths as normal light $L_1$ and abnormal light $L_2$. The two light rays $L_1$ and $L_2$ are spaced apart by a distance $\Delta l$ at the light-exiting surface 12. From there, they exit along paths parallel to travel direction of the incident light L. The space $\Delta l$ is determined by factors such as the kind of the anisotropic substance of the filter element 10 and the thickness of the flat plate.

In the case where the incident light L is natural light, it is separated in the anisotropic medium into the normal light $L_1$ vibrating in the direction of the X axis and the abnormal light $L_2$ vibrating in a direction which is offset by 90 degrees from the X-axis direction, within a plane perpendicular to the angle of incidence of the light L. The normal light $L_1$ and the abnormal light $L_2$ are linearly polarized light rays respectively vibrating separately in only the above stated X-axis and 90-degree offset axis. In the drawings, natural light vibrates in all directions in a plane perpendicular to the advancing direction of the light and is represented by a symbol comprising a circle and two arrows intersecting each other within the circle. Furthermore, the vibration of the normal light $L_1$ in the X-axis direction, that is, in the direction perpendicular to the plane of the drawing is also represented by a black dot mark. The vibration direction of the abnormal light $L_2$ is indicated by opposing arrows mark.

If the incident light L undergoes a bright-dark repetition in the same directions as the normal light $L_1$ and the abnormal light $L_2$ at the light-exiting surface 12, and if the spacing of the bright-dark repetition is equal to the distance $\Delta l$, the bright portions and dark portions of the incident light L mutually overlap and cancel each other at the light-exiting surface 12. As a consequence, this optical comb filter element 10 exhibits a comb filter characteristic having attenuation points at the space frequency indicating the bright-dark repetition of the above mentioned spacing $\Delta l$ and at frequencies that are odd-number multiples thereof. The filter has pass bands for DC components and at frequencies that are even-number multiples of the above mentioned space frequency. Accordingly, the space frequency f which is removed in this optical comb filter 10 and the above mentioned spacing $\Delta l$ are so related that one half of the reciprocal of the space frequency f is equal to the distance $\Delta l$, that is, $\frac{1}{2}f = \Delta l$.

Figure 2:
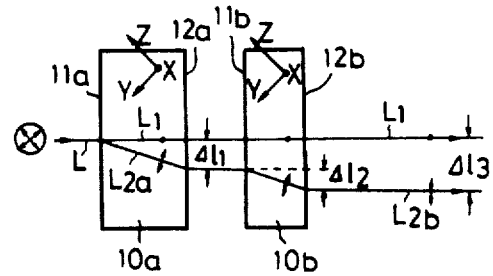
FIG. 2 is a diagrammatic plan view for describing the function when a plurality of (two) optical comb filter elements are combined.

As a supposition, two optical comb filter elements 10a and 10b used in a combined state as shown in FIG. 2 and as described hereinbefore with respect to a prior-art example will be considered. The filter element 10a has attenuation points at a space frequency $f_1$ and frequencies $3f_1, 5f_1, \ldots$ that are odd-number multiples of $f_1$ and has a characteristic for removing the frequency components thereof. The filter element 10b has attenuation points at a space frequency $f_2$ and frequencies $3f_2, 5f_2, \ldots$ that are odd-number multiples of $f_2$ and has a characteristic for removing the frequency components thereof.

Incident light L entering the incident surface 11a of the filter element 10a is divided in the element into a normal light $L_1$ and an abnormal light $L_{2a}$. This divided light exits, with a space $\Delta l$, therebetween, from the light-exiting surface 12a and enters the succeeding filter element 10b. The normal light $L_1$ is linearly polarized, to vibrate in a direction (X-axis direction) perpendicular to the plane of the drawing. The normal light $L_1$ entering the filter elements 10b does not separate but advances in a straight line through the filter medium and exits as it is through the light-exiting surface 12b. On the other hand, the abnormal light $L_{2a}$ is a linearly polarized light which vibrates in a direction which is offset by 90° from the X-axis in the plane perpendicular to the advancing direction of the light. The abnormal light $L_{2a}$ entering the filter element 10b does not separate but undergoes an abnormal refraction and exits as abnormal light $L_{2b}$ through the light-exiting surface 12b. This abnormal refraction produces a further spacing distance of $\Delta l_2$, whereby the resulting total spacing $\Delta l_3$ between the normal light $L_1$ and the abnormal light $L_{2b}$ exiting through the light-exiting surface 12b is equal to the sum of the spacing $\Delta l_1$ and $\Delta l_2$.

Accordingly, when the filter elements 10a and 10b have the above mentioned attenuation points and are used in merely a combined state, the only comb filter characteristic which is obtained is the same as that of a single optical comb filter, in which the divergence spacing betwen the normal light and the abnormal light becomes $\Delta l_3$. Consequently, such a combination of filters cannot remove the frequencies $f_1$ and $f_2$ and frequencies which are odd-number multiples thereof, which are the inventive objects of removal.

Accordingly, in order to overcome this problem, the filter elements 10a and 10b are used in a state in which their respective optical axes are rotated to have a mutually offset angle of 45 degrees. However, since the optical axes of the filter elements are mutually offset by 45 degrees, the positions of two of each of the normal and abnormal lights exiting from the light-exiting surface do not become aligned on a single plane. For this reason, the comb filter characteristic appears not only in the originally required horizontal scanning line direction but also in the direction which is perpendicular to the horizontal scanning line, whereby the vertical resolution of the reproduced picture deteriorates. Furthermore, since the offset direction must be designed by converting into terms of the horizontal direction, it has been difficult to design the optical comb filter.

The present invention has succeeded in overcoming the problems of the above described systems. It will now be described with respect to preferred embodiments thereof.

Figure 3:
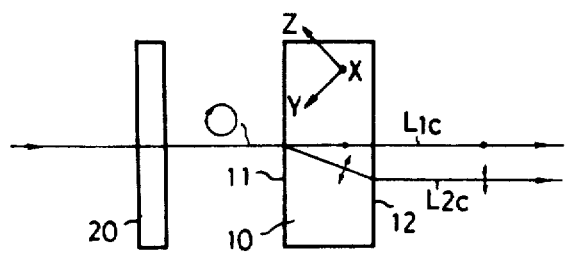
FIG. 3 is a diagrammatic plan view for describing the principle of an essential part of the optical comb filter according to the invention.

The principle of the optical comb filter according to the present invention will be described with reference to FIG. 3. In the arrangement shown therein, use is made of a phase plate 20 which is, for example, a $\lambda/4$ plate. It causes light exiting therefrom to have a certain phase difference relative to a corresponding incident light, as a result of a difference in the velocity of the light in correspondence with a difference between the vibration directions of the incident light. Accordingly, light entering, as incident light, into the phase plate 20 is rendered into a light having a certain polarization at the time it exits from the phase plate. For example, if the phase plate 20 is installed so that its optical axis is at angle $\theta$ relative to the vibration direction of a linearly polarized light entering as incident light, there is a linearly polarized light which is the same as the incident light which exits from the phase plate 20 only when the angle $\theta$ is 0, 90, and $-90$ degrees. At any other angle, an elliptically polarized light exits from the phase plate. When the angle $\theta$ is 45 or $-45$ degrees, a circularly polarized light exits from the phase plate.

Here, the phase plate 20 is set so that its optical axis is directed in a direction such that it is at an angle of 45 degrees relative to the X-axis, within a plane perpendicular to the direction of advancing light. Accordingly, when a linearly polarized light vibrating in a direction perpendicular to the plane of the drawing passes through the phase plate 20, for example, it is converted into a circularly polarized light undergoing circular vibration in a plane perpendicular to the light advancing direction, as indicated by the circular arrow symbol.

The light which has passed through the phase plate 20 enters, as incident light, into an optical comb filter element 10 which is the same as that shown in FIG. 1. Since this light entering the filter element 10 is a circularly polarized light, it has vibration vector components similar to those of natural light. In the filter element 10, the entering light is divided into a normal light $L_{1c}$ and an abnormal light $L_{2c}$ which thus advance through the filter element. Thus, by providing the phase plate 20 in front of the front surface of the filter element 10, two light rays of equal light quantity are spaced apart by a space $\Delta l$. These light quantities can be obtained from the filter element 10 even when the incident light is linearly polarized light. Therefore, an optical comb filter characteristic can be exhibited also with respect to linearly polarized light.

Figure 4:
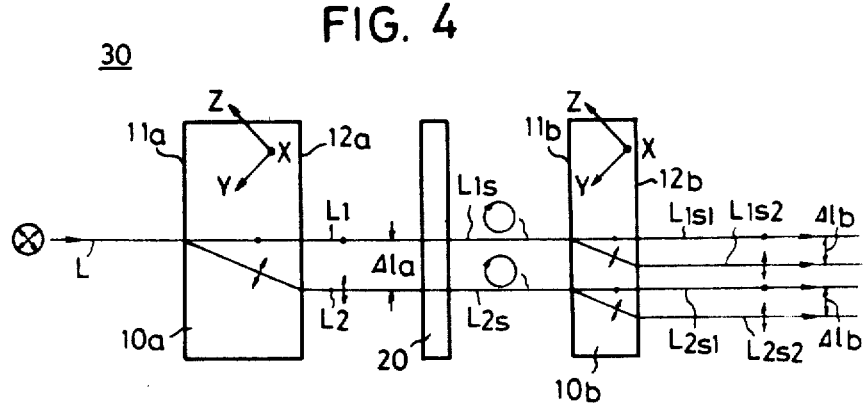
FIG. 4 is a diagrammatic plan view of a first embodiment of the optical comb filter according to the invention.

A first embodiment of the optical comb filter, according to the present invention, will now be described with reference to FIG. 4. The optical comb filter 30 comprises, on an axis in the light advance direction, optical comb filter elements 10a and 10b made in the form of flat plates of a transparent anisotropic substance (such as quarts) having double refractivity and a phase plate 20 such as a $\lambda/4$ plate interposed between the filter elements 10a and 10b. The filter elements 10a and 10b are so orientated that their respective light axes Z are mutually parallel, while their respect X-axes and Y-axes are mutually parallel. Actually, the filter element 10a, the phase plate 20, and the filter element 10b are in close contact and thus constitute an integral structure. They are shown in FIG. 4 as being spaced apart solely for the convenience of description.

Figure 5:
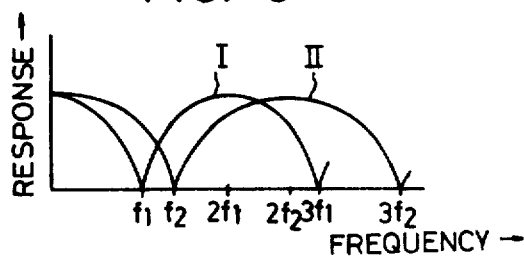
FIG. 5 is a diagram showing characteristics of the respective optical comb filter elements constituting the optical comb filter shown in FIG. 4.

The optical comb filter element 10a has an optical comb filter characteristic wherein there are attenuation points at a specific space frequency $f_1$ and frequencies which are odd-number multiples thereof. There are pass bands with respect to DC component and to frequencies which are even-number multiples of the frequency $f_1$ as indicated by curve I in FIG. 5. The optical comb filter element 10b has an optical comb filter characteristic wherein there are attenuation points at a specific space frequency $f_2$ and frequencies which are odd-number multiples thereof. There are pass bands with respect to DC component and to frequencies which are even-number multiples of the frequency $f_2$ as indicated by curve II in FIG. 5.

A natural light L entering the incidence surface 11a of the filter element 10a is divided and thus advances and exits or emerges from the light-exiting surface 12a in the form of a normal light $L_1$ and an abnormal light $L_2$, spaced apart by a space $\Delta l a$. As a consequence, the specific space frequency $f_1$ corresponding to the space $\Delta l a$, and frequencies that are odd-number multiples, thereof are attenuated and removed by the filter element 10a. The normal light $L_1$ is a linearly polarized light vibrating in the X-axis direction, while the abnormal light $L_2$ is a linearly polarized light vibrating in a direction which is at an angle of 90 degrees relative to the X-axis, within a plane perpendicular to the advance direction. Both lights $L_1$ and $L_2$ pass through the phase plate 20. Here, as described hereinbefore in conjunction with FIG. 3, the phase plate 20 is so set that its optical axis is at an angle of 45 degrees relative to the X-axis, within a plane perpendicular the light advance direction. For this reason, the two linearly polarized lights $L_1$ and $L_2$ are respectively converted into circularly polarized lights $L_{1s}$ and $L_{2s}$ as a result of passing through the phase plate 20.

Since the light $L_{1s}$ entering the incidence surface 11b of the filter element 10b is a circularly polarized light, it is divided into two lights. These two lights advance and exit from the light-exiting surface 12b as lights $L_{1s1}$ and $L_{1s2}$ spaced apart by a space $\Delta l b$. Similarly, since the light $L_{2s}$ entering the incidence surface 11b is also a circularly polarized light, it is divided into two lights, which thus advance and exit from the light-emerging surface 12b as lights $L_{2s1}$ and $L_{2s2}$ spaced apart by a space $\Delta l b$. Here, the space $\Delta l a$ is not equal to the space $\Delta l b$. As a consequence, the specific space frequency $f_2$ corresponding to the space $\Delta l b$ and frequencies that are odd-number multiples thereof are attenuated and removed.

In this connection, the filter elements 10a and 10b and the phase plate 20 are so arranged that the separation space direction of the lights exiting from the filter element 10b coincides with the horizontal scanning direction of the electron beam.

Figure 6:
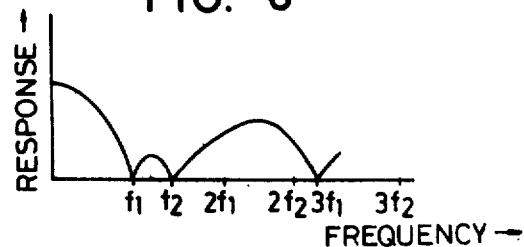
FIG. 6 is a diagram showing a characteristic of the optical comb filter shown in FIG. 4.

A phase plate 20 is provided in front of the front surface of the filter element 10b in the optical comb filter, according to the present invention. A result such as that indicated in FIG. 2 is not obtained even when the light exiting from the filter element 10a is linearly polarized light. The comb filter has a characterisitc indicated in FIG. 6 which is obtained by a mutual superimposition of the comb filter characteristics I and II indicated in FIG. 5, respectively, of the filter elements 10a and 10b.

The filter elements 10a and 10b are so arranged that their optical axes Z are parallel. Each exiting light $L_{1s1}$, $L_{1s2}$, $L_{2s1}$, and $L_{2s2}$ lies in one plane coinciding with the horizontal scanning direction of the electron beam in the camera tube. Accordingly, the optical comb filter 30 exhibits a comb filter characteristic only in the horizontal scanning line direction.

Figure 7:
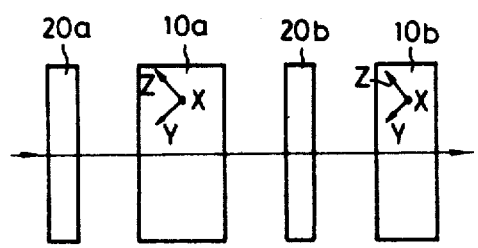
FIGS. 7 and 8 are respectively diagrammatic plan views of second and third embodiments of the optical comb filters accordkng to the invention.

The embodiment of FIG. 7 is suitable if the incident light entering the optical comb filter is not natural light, but is a linearly polarized light such as, for example, light which has passed through a semitransparent mirror, or light which has been reflected by a semitransparent mirror, or if light reflected from an object is picked up with a specific polarization.

A first phase plate 20a is disposed at the front surface of a first optical comb filter element 10a which is at the most forward position with respect to the light advancing direction. A second phase plate 20b is interposed between the first optical comb filter element 10a and a second optical comb filter element 10b. As a result of incident light passing through the first phase plate 20a, this incident light is converted into a substantially circularly polarized light, even when the incident light has the above mentioned polarization. The resulting substantially circularly polarized light enters, as incident light, the first filter element 10a. Accordingly, even when the incident light has polarization, it is divided into normal light and abnormal light, as in the embodiment of the invention described hereinbefore and illustrated in FIG. 4. As a consequence, the frequency $f_1$ and frequencies that are odd-number multiples thereof are attenuated and removed in the filter element 10a. The light exiting from the first filter element 10a passes through the second phase plate 20b and enters, as incident light, the second filter element 10b. The frequency $f_2$ and frequencies that are odd-number multiples thereof are attenuated and removed, as in the above described embodiment of the invention.

A specific example of numerical values relating to an NTSC system, color television camera apparatus in which a vidicon of one-inch size is used will now be set forth. In this example, the phase plates 20a and 20b are λ/4 plates made of an acetate resin, and their retardance is 147 mm. The filter element 10a is a quartz plate having a thickness of 5.865 mm. and has a comb filter characteristic. It is capable of attenuating a frequency of 3.6 MHz and frequencies that are odd-number multiples thereof. The filter element 10b is a quartz plate of a thickness of 2.933 mm. and has a comb characteristic capable of attenuating a frequency of 7.2 MHz and frequencies that are odd-number multiples thereof.

Figure 8:
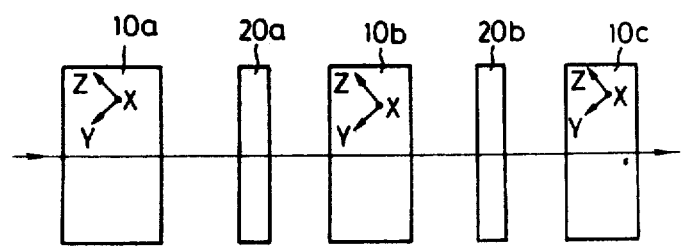

The number of filter elements in the optical comb filter, according to the invention, is not limited to two but may be more than two. For example, if there are three, specific space frequencies to be removed, filter elements 10a, 10b, and 10c are used with filter characteristics respectively having attenuation points at specific space frequencies $f_1$, $f_2$, and $f_3$ and respective frequencies that are odd-number multiples thereof, as in the embodiment of the invention shown in FIG. 8. Phase plates 20a and 20b are arranged in an interposed state, respectively, between the filter elements 10a and 10b and between the filter elements 10b and 10c. Description of the functional features of this optical comb filter will be omitted since they can be readily understood from the foregoing description of the preceding embodiments of the invention.

In in the above described embodiments of the invention, a λ/4 plate is used for each phase plate phase plate is not thus limited in the practice of the invention but may be a phase plate other than a λ/4 plate which is so disposed that its optical axis is at a suitable angle relative to the horizontal scanning direction of the electron beam of the camera tube.

Further, this invention is not limited to these embodiments. Variations and modifications may be made without departing from the scope of the invention.

What is claimed is:

1. An optical comb filter comprising: a plurality of optical comb filter element means disposed successively in the advancing light direction, said successive element means respectively having optical comb filter characteristics for attenuating and removing specific space frequencies which do not have mutual relationships of odd-number multiples and frequencies that are respectively odd-number multiples of said specific space frequencies; and at least one phase plate means interposed between neighboring optical comb filter element means respectively in front and rear positions with respect to said light advancing direction, normal and abnormal linearly polarized light exiting from said front filter element means, said phase plate means converting said linearly polarized light into substantially circularly polarized light which enters a rear one of filter element means as incident light, said substantially circularly polarized light being divided in said rear filter element means into normal light and abnormal light exiting with mutually equal light quantity.

2. An optical comb filter as claimed in claim 1 in which said phase plate means comprises a flat plate of a λ/4 plate.

3. An optical comb filter as claimed in claim 1 which further comprises an additional phase plate means disposed in front of a front surface of the optical comb filter element means which is in the foremost position with respect to said light advancing direction.

4. An optical comb filter for a color television camera means having a color-separation striped filter and a camera tube for obtaining color television signals, said optical comb filter comprising: a plurality of optical comb filter element means respectively comprising flat plates of a transparent anisotropic substance having double refractivity and having optical comb filter characteristics for attenuating and removing respective specific space frequencies which do not have mutual relationships of odd-number multiples, said mutual relationships being determined by said color-separation striped filter and frequencies that are odd-number multiples respectively of said specific space frequencies, light advancing through said optical comb filter means in a divided state as normal and abnormal light and exiting from said optical comb filter means with a separation space therebetween as determined by the filter element means, said filter element means being disposed so that the direction of separation between the normal and abnormal exiting light coincides with the horizontal scanning direction of the electron beam of the camera tube; and at least one phase plate means interposed between neighboring optical comb filter element means for converting linearly polarized light exiting from a front one of said neighboring filter element means, with respect to the direction in which light advances through said optical comb filter and causing circularly polarized light to enter as incident light into a rear one of said neighboring filter element means.

5. An optical comb filter as claimed in claim 4 further having an additional phase plate means disposed in front of a front surface of the optical comb filter element means which is in the foremost position with respect to the direction in which said light advances.

* * * * *